United States Patent [19]

Makiura et al.

[11] Patent Number: 4,763,174

[45] Date of Patent: Aug. 9, 1988

[54] MAGNIFICATION SELECTING DEVICE IN A PHOTOCOPIER

[75] Inventors: Yoshinori Makiura, Tondabayashi; Takahiro Wakikaido, Yao; Haruo Yamamoto, Sennan; Shusaku Ogawa, Sumiyoshi; Takao Ichihashi, Sakai, all of Japan

[73] Assignee: Mita Industrial Co., Ltd., Japan

[21] Appl. No.: 922,423

[22] Filed: Oct. 23, 1986

[30] Foreign Application Priority Data

Oct. 28, 1985 [JP] Japan ................................ 60-242289

[51] Int. Cl.$^4$ ......................... G02B 7/11; G03B 27/52

[52] U.S. Cl. ....................................... 355/55; 350/429

[58] Field of Search ................. 350/429; 355/3 R, 50, 355/55–57

[56] References Cited

U.S. PATENT DOCUMENTS

| | | | |
|---|---|---|---|
| 3,002,422 | 10/1961 | Lohmeyer | 350/429 |
| 4,417,281 | 11/1983 | Hama | 350/429 |
| 4,531,831 | 7/1985 | Kitajima et al. | 350/429 |
| 4,555,165 | 11/1985 | Negoro | 350/429 |
| 4,611,909 | 9/1986 | Ogura et al. | 355/55 |
| 4,618,252 | 10/1986 | Hisajima et al. | 355/55 |
| 4,624,552 | 11/1986 | Asako | 355/55 |
| 4,647,191 | 3/1987 | Kunikawa et al. | 355/56 |

FOREIGN PATENT DOCUMENTS

| | | |
|---|---|---|
| 0080577 | 8/1983 | European Pat. Off. . |
| 0127867 | 12/1984 | European Pat. Off. . |

*Primary Examiner*—John K. Corbin

*Assistant Examiner*—Loha Ben

*Attorney, Agent, or Firm*—Beveridge, DeGrandi & Weilacher

[57] ABSTRACT

A magnification selecting device which is capable of continuously varying magnifications by operating either UP or DOWN key and also slowing down the speed of varying mangifications only when these magnifications are in a position close to the predetermined magnification.

3 Claims, 5 Drawing Sheets

MAGNIFICATION SELECTING DEVICE IN A PHOTOCOPIER

BACKGROUND OF THE INVENTION

The present invention relates to a magnification selecting device, more particularly, to a magnification selecting device which is capable of continuously varying magnifications by operating either UP key or DOWN key.

A prior art presents in its Japanese Patent Laid Open Publication No. 220772 of 1984 a mechanism related to the image generating apparatus such as an electrophotographic copying machine, which is provided with the UP and DOWN keys for finely selecting magnifications so that the magnification can continuously be increased or decreased by selectively operating either of these keys. This apparatus is also provided with the stationary magnification key for selecting any of those magnifications which are frequently made available for either enlarging or reducing between papers of stationary sizes so that any desired magnification can easily be selected by operating any of the stationary magnification keys.

Since the image generating apparatus mentioned above is provided with the stationary magnification keys in addition to the UP and DOWN keys, operational characteristic can certainly be improved. On the other hand, unless the number of keys on the operation panel is minimized, operation of other keys including an effort for finding the keys to be operated unavoidably involves complexity to conversely lower the total operational characteristics. As a result, the kind of stationary magnification key should be minimized. If the kind and number of the stationary magnification keys were minimized, there will be a number of such stationary magnifications that cannot be accessed by operation of the stationary magnification keys, which any of these stationary magnifications should carefully be selected by operating either of the UP and DOWN keys.

When selecting the desired magnification by operating either of the UP and DOWN keys, since the conventional apparatus allows the UP and DOWN keys to set minimum of 64% through a maximum of 141% by 1% graduation, when varying magnifications by operating either of these UP and DOWN keys, magnification varies itself at a considerably fast speed like 8 milliseconds/% for example, and as a result, it is extremely difficult for the operator to precisely control the timing to stop the operation of either of these UP and DOWN keys while watching the magnification display. Actually, the desired magnification is easily passed when the key operation is stopped. To correctly set the magnification to the desired value, the operator is obliged to repeat operations of the UP and DOWN keys many times, thus eventually resulting in the poor operational characteristic for correctly selecting the aimed magnification.

In addition, when operating the copying machine for generating picture image by using a stationary magnification, a certain amount of blank portion may have to be provided in the edge portion of the generated image. When this is actually needed, after selecting the desired magnification by operating one of the stationary magnification key, the operator is then obliged to diminish the magnification by several percents by operating the DOWN key, thus unavoidably facing poor operational characteristic for selecting the aimed magnification as mentioned above.

SUMMARY OF THE INVENTION

The primary object of the present invention is to realize the simplified construction of the operation panel by abbreviating the stationary magnification key.

Another object of the present invention is to allow the operator to easily identify the timing needed for stopping the operation of either UP key or DOWN key when selecting the desired magnification.

A still further object of the present invention is to allow the operator to easily select any magnification which is frequently made available.

A still further object of the present invention is to securely inhibit prolongation of time needed for selecting the desired magnification.

To securely achieve those objects mentioned above, the magnification selecing device embodied in the present invention causes magnifications to continuously vary themselves by selectively operating either UP or DOWN keys, and varying speed of magnifications which are continuously varied by key operation is slowed down only when reaching a certain magnification close to the aimed magnification.

However, the aimed magnification should preferably be the one which is very frequently made available.

Using the magnification selecing device of the present invention, magnifications can continuously be varied by continuously operating either UP or DOWN key. Since the device related to the present invention slows down the speed for varying magnification as soon as the actual magnification is close to the aimed magnification, the operator can securely set both the predetermined magnification and the approximates to it by properly controlling the timing needed for stopping operation of either UP or DOWN key while watching the magnification display.

If the operator specifies such a magnification which is frequently made available for either enlarging or reducing between papers of stationary sizes, the operator can set not only the intended magnification, but he can also set a specific magnification needed for generating a certain blank portion in paper edges by properly controlling the timing needed for stopping operation of either of UP and DOWN keys while watching the magnification display.

BRIEF DESCRIPTION OF THE DRAWINGS

The present invention will be better understood from the detailed description given hereinbelow and the accompanying drawings which are given by way of illustration only, and thus are not limitative of the present invention in which.

DESCRIPTION OF THE PREFERRED EMBODIMENTS

Figure 4:
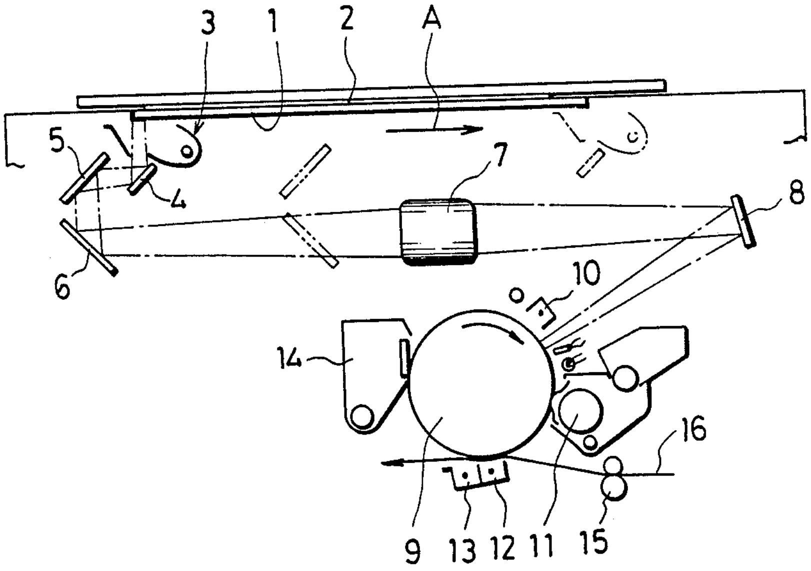
FIG. 4 is the schematic diagram denoting the essential part of the copying machine incorporating the magnification selecting device related to the present invention.

FIG. 4 is the schematic diagram denoting the essential part of the copying machine. An original 2 placed on the contact glass 1 is illuminated by the light source 3 which moves itself in the arrowed direction A shown in FIG. 4. Light reflected from the original 2 is then led to the external surfce of the photoreceptor drum 9 via reflection mirrors 4 through 6, a lens 7, and another reflection mirror 8 before eventually generating electrostatic latent image corresponding to the original image. The reflection mirror 4 integrally moves together with the light source 3, whereas reflection mirrors 5 and 6 respectively move themselves in the same direction at one second the speed of the light source 3.

A corona charger 10, a developing device 11, a transfer charger 12, a separation charger 13, and a cleaner 14 are respectively disposed in the periphery of the photoreceptor drum 9 in the order mentioned above. The external surface of the photoreceptor drum 9 is uniformly charged by the corona charger 10. On receipt of reflective light, electrostatic latent image is generated, which is then developed into toner image by the developing device 11. The toner image is then transferred onto the copying paper 16 conveyed by the resist roller 15 by applying the transfer charger 12. The copied paper 16 is then peeled from the photoreceptor drum 9 by means of the separation charger 13, and finally, residual toner is collected from the surface of the photoreceptor drum 9 by using the cleaner 14.

Figure 3:
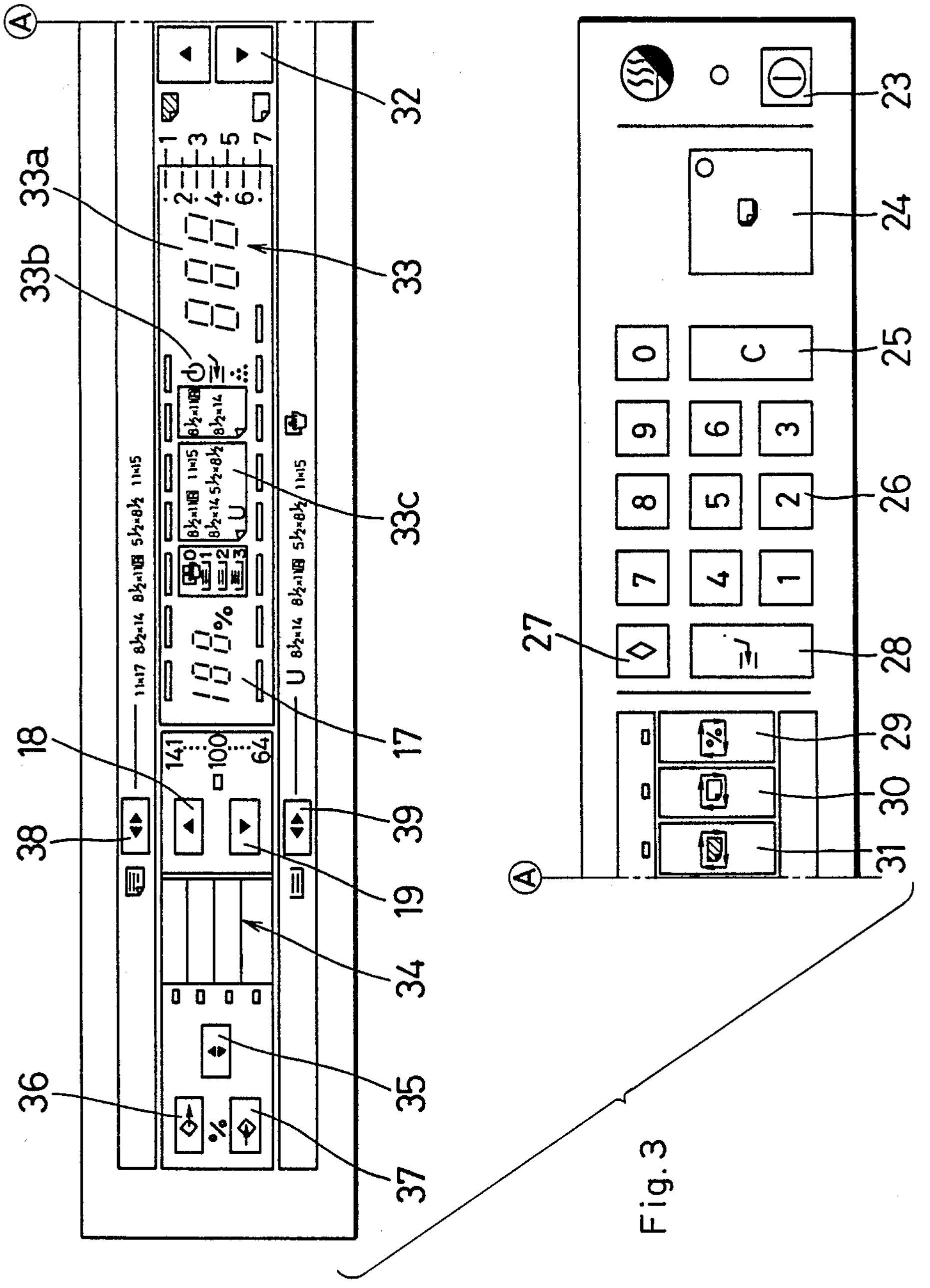
FIG. 3 is the schematic diagram denoting the essential part of the operation panel of a copying machine incorporating the magnification selecting device embodied in the present invention.

FIG. 3 is the schematic diagram denoting the operation panel of the copying machine which is provided with an UP key 18 and a DOWN key 19 in positions close to a magnification display 17.

The detailed constitution of the operation panel is described below. The operation panel is provided with the following: A preheating key 23, a printactivation key 24, a clear key 25, ten keys 26 for setting the number of papers to be copied, a key 27 for displaying the number of papers to be copied, an interruption key 28, an automatic magnification selecting key 29, an automatic copying paper size selecting key 30, an automatic copying concentration setting key 31, a manual copying concentration setting key 32, a display unit 33, a stored magnification display part 34, stored magnification selecting key 35, a stored magnification reading key 36, a magnification memory key 37, an original size, selecting key 38, and a copying paper size selecting key 39. Of these, the display unit 33 is provided with a display 33*a* for indicating the number of papers to be copied or the number of copied papers, a status display 33*b* indicating the warming-up condition, interrupted condition, and diminished condition of toner amount, a paper-size display 33*c*, and the magnification display 17, respectively.

Figure 1:
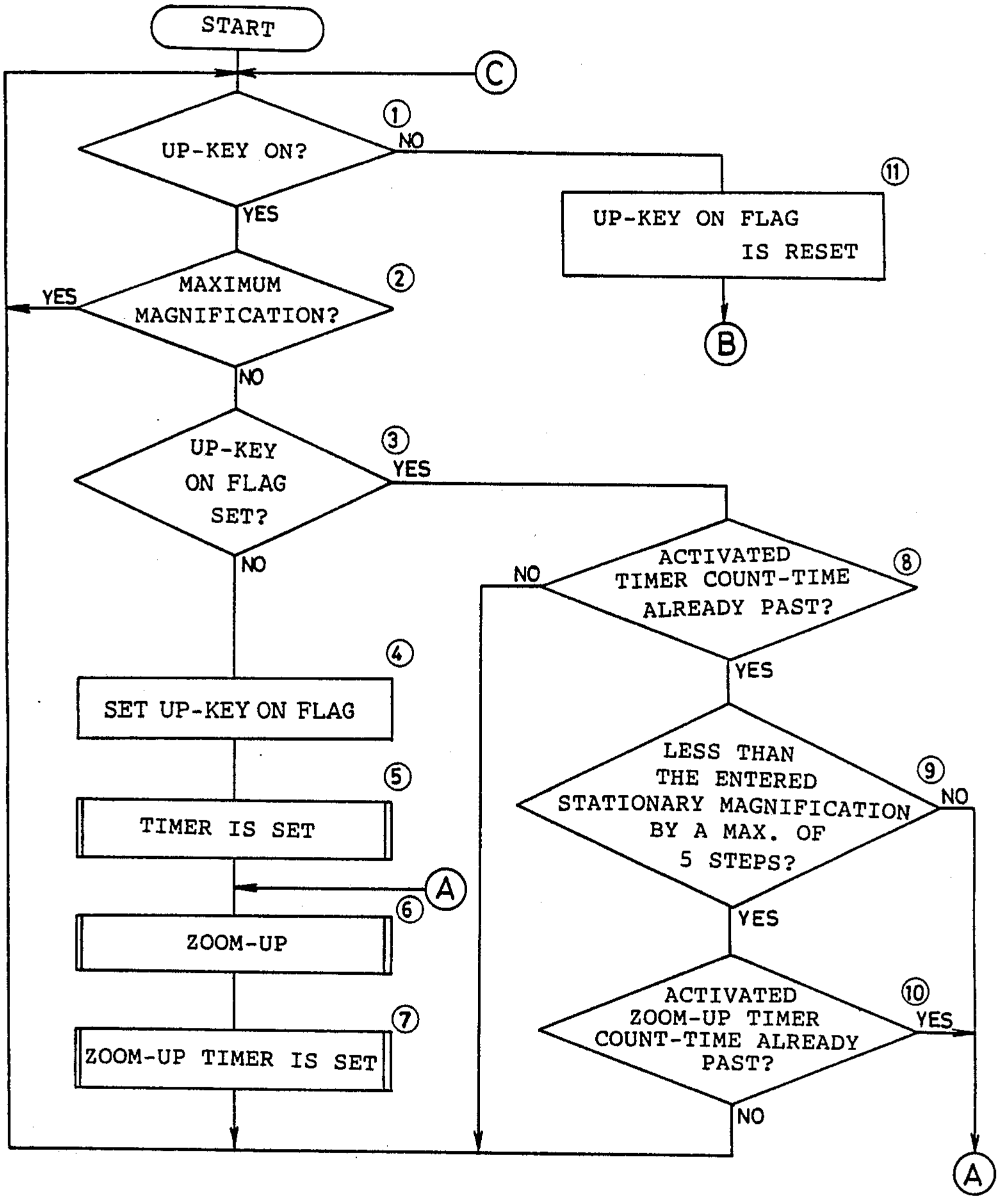
FIG. 1 is respectively the flowcharts describing operations needed for selecting the aimed magnification.
Figures 1, 2:
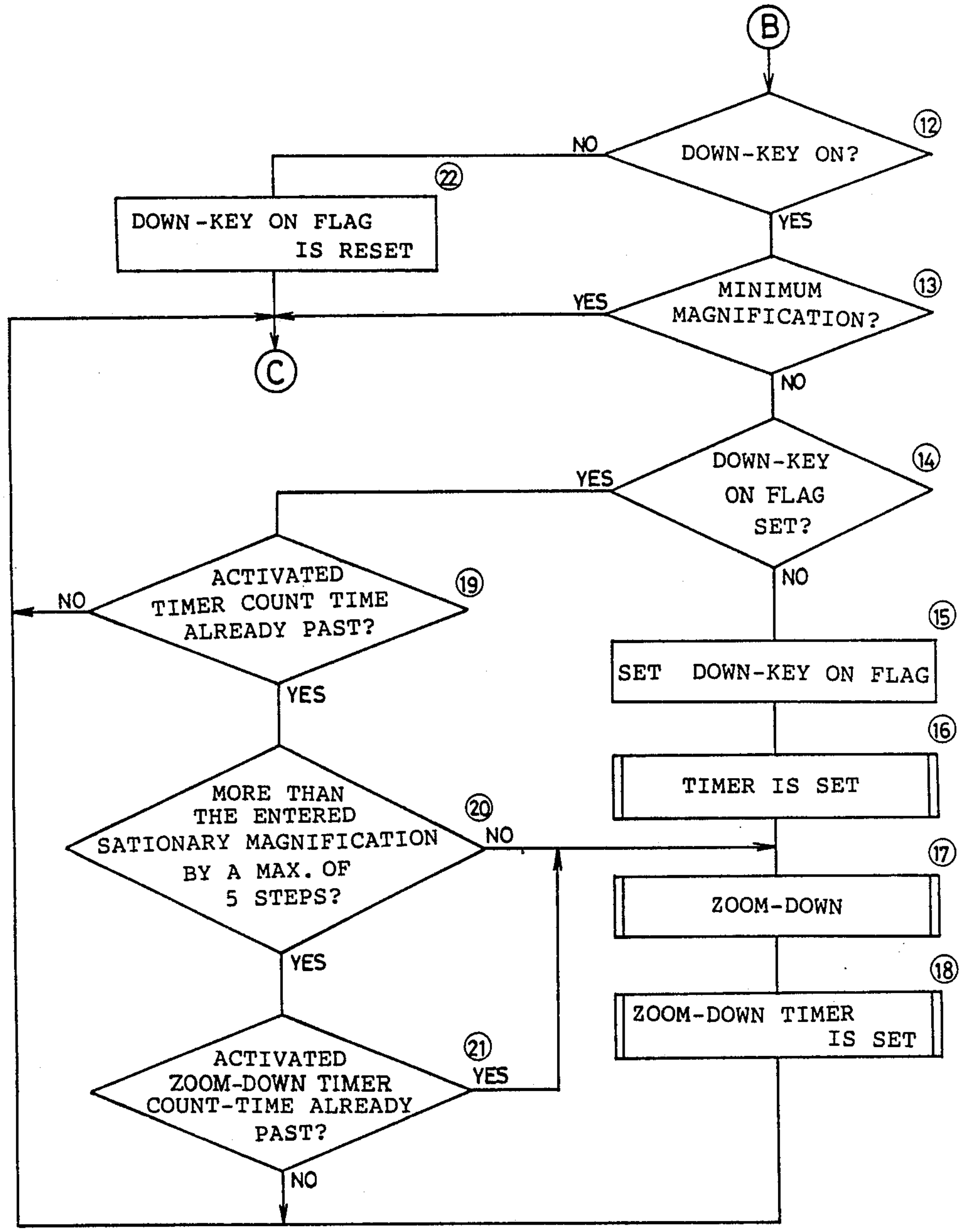
FIG. 2 is the block diagram denoting the electrical constitution of the magnification selecting device embodied in the present invention.
Figure 2:
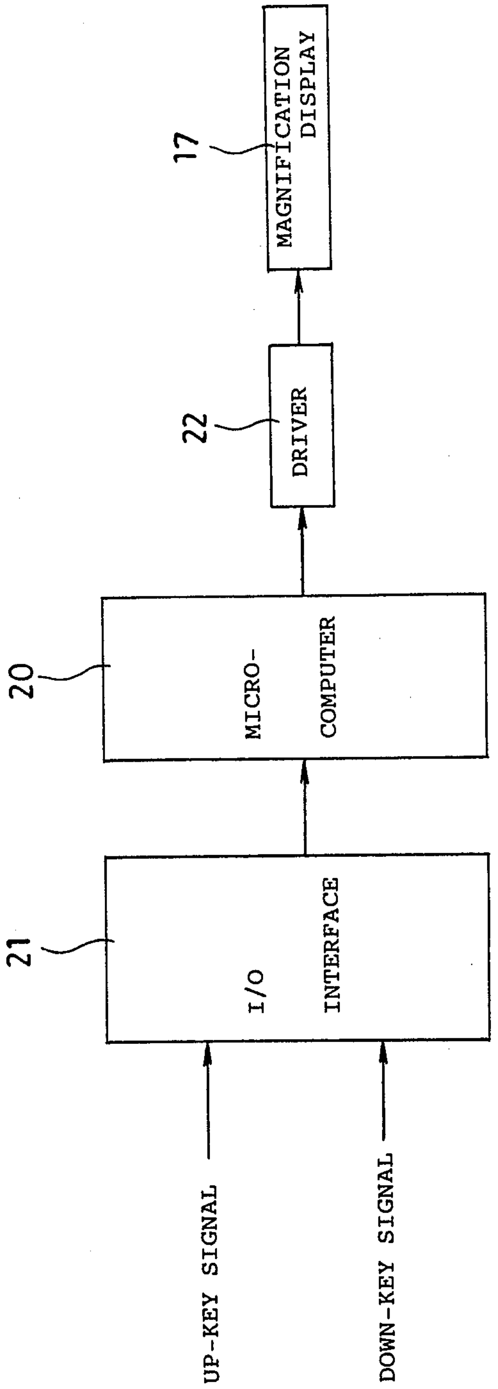

FIG. 2 is the simplified block diagram of electrical constitution of the magnification selecting device related to the present invention. Activated UP-key signal and DOWN-key signal are respectively delivered to a microcomputer 20 via an I/O interfce 21. Control signal from the microcomputer 20 is delivered to driver unit 22 which drives the magnification display 17.

FIG. 1 is respectively the flowchart describing operations needed for selecting the aimed magnification. When step 1 is entered, the microcomputer 20 identifies whether the UP-key 18 is depressed, or not. If it is depressed, step 2 is entered to allow the microcomputer 20 to identify whether the maximum magnification is present, or not. If it is present, the microcomputer 20 then identifies whether the UP-key 18 is depressed or not at step 1. In other words, when the maximum magnification is set, magnification cannot be varied by operating the UP-key.

If the maximum magnification is not present, step 3 is entered to allow the microcomputer 20 to identify whether the UP-key ON flag is activated, or not. If it is identified by the microcomputer 20 that this flag remains inactivated, step 4 is entered to activate the UP-key ON flag. Next, step 5 is entered to activate timer to proceed to step 6 in which zoom-up operation is executed for increasing magnification by 1%. When step 7 is entered, zoom-up timer is activated. After activating zoom-up timer, the system operation again returns to step 1 to follow up those identifications and operations mentioned above.

If the microcomputer 20 identifies during step 3 that the UP-key ON flag is activated, the microcomputer 20 then identifies during step 8 whether the timer counting time set to be 500 milliseconds for example at step 5 is past, or not. If the above mentioned timer counting time is not yet past, the microcomputer 20 then activates those serial identifications and operations starting from step 1 on. Otherwise the above mentioned timer counting time is past, the microcomputer 20 then identifies at step 9 whether the magnification is in a range being less than any of the predetermined stationary magnifications by a maximum of 5 steps, i.e., by a maximum of 5%, or not. If the actual magnification is less than any of those predetermined stationary magnifications by a maximum of 5 steps or 5%, the microcomputer 20 then identifies at step 10 whether a specific duration such as 0.5 seconds for example preset by the zoom-up timer is already past, or not. If it is identified at step 10 that 0.5 seconds is not yet past, the controller system then follows up execution of those identifications and operations starting from step 1 on. When the microcomputer 20 identifies at step 9 that the actual magnification is not in a range less than any of those predetermined magnifications by a maximum of 5 steps or 5% or at step 10 that the preset 0.5 seconds is already past, the controller executes those serial identifications and operations starting from step 6 on.

In addition, when the microcomputer 20 identifies at step 1 that the UP-key 18 is not depressed, UP-key ON flag is reset at step 11. The microcomputer 20 then identifies at step 12 whether DOWN-key 19 is depressed, or not. If it is already depressed, the microcomputer 20 then identifies at step 13 whether the minimum magnification is present, or not. If the minimum magnification is present, controller system then executes those serial identifications and operations starting from step 1 on. When the minimum magnification is present, magnification cannot be varied by operating the DOWN-key 19.

If the minimum magnification is not present, the microcomputer 20 then identifies at step 14 whether DOWN-key ON flag is activated, or not. If it is identified at step 14 that the DOWN key ON flag is not yet activated, the microcomputer 20 then activates it at step 15. Then, the microcomputer 20 activates timer at step 16 and executes zoom-down operation at step 17 for decreasing the magnification by 1%. The controller system then activates zoom-down timer at step 18 before resuming the execution of those serial identifications and operations starting from step 1 on.

Conversely, if the microcomputer 20 identifies at step 14 that the DOWN-key ON flag is already activated, the microcomputer 20 then identifies at step 19 whether timer counting time set to be 500 milliseconds for example at step 16 is already past, or not. If it is not yet past, controller system then executes those serial identifications and operations starting from step 1 on. If the preset time is already past, the microcomputer 20 then identifies at step 20 whether the actual magnification is in a range greater than any of those predetermined stationary magnifications by a maximum of 5 steps, i.e., by a maximum or 5%, or not. If it is in a range greater than any of those predetermined stationary magnifications by a maximum of 5 steps or 5%, the microcomputer 20 then identifies at step 21 whether a specific duration such as 0.5 seconds for example preset by zoom timer is already past, or not. If it is identified at step 21 that 0.5 seconds of preset duration is not yet past, controller system then executes those serial identifications and operations starting from step 1 on. Conversely, if it is identified that the actual magnification is not in a range greater than any of those predetermined magnifications by a maximum of 5 steps or 5%, at step 20 or that 0.5 seconds of the preset duration is already past at step 21, controller system then executes those serial identifications and operations starting from step 17 on.

If the microcomputer 20 identifies at step 12 that the DOWN key 19 is not yet depressed, DOWN-key ON flag is reset at step 22 to allow the controller system to execute those serial identifications and operations starting from step 1 on.

Summarizing above, when either the UP-key or DOWN-key 19 has been operated for a maximum of 500 milliseconds, magnification can be varied by 1% graduation whenever either of these keys is operated.

When either of these keys is continuously operated for more than 500 milliseconds, magnification can continuously be varied by 1% graduation in response to the key-operating duration, thus effectively saving time needed for selecting the desired magnification. When continuously operating either of these UP and DOWN keys, if the magnification is in a range of a maximum of 5 steps preceding in the direction of varying magnification in reference to any of those predetermined stationary magnification, controller system then executes either zoom-up or zoom-down operation at specific intervals preset by either zoom-up or zoom-down timer.

Consequently, when selecting a specific magnification which is significntly apart from any of the predetermined stationary magnifications, desired magnification should be set by properly controlling the timing needed for stopping the key operation while visually watching the quickly-varying magnifications via the magnification display 17 as is normally done with any conventional magnification selecting devices. However, since the needs for executing such an extraordinary operation rarely occur, this is not a critical problem. Conversely, since the magnification selecting device embodied in the present invention causes magnifications to vary themselves at a slowed-down speed when the desired magnification is at a position close to any of those stationary magnifications which are frequently made available, it is extremely easy for the operator to properly control the timing needed for stopping the key operation while watching the magnification display. Actually, the magnification selecting device embodied in the present invention abbreviates the key for specifically accessing the stationary magnifications and dispenses with memory means, and yet, it can easily select such a magnification approximating the stationary magnification in order to provide blank portion for papers to be copied.

In addition, the magnification selecting device related to the present invention allows stationary magnifications to be stored in memory. The magnification selecting device mentioned above allows any magnification other than the stored one to be easily and securely selected.

Furthermore, it is possible for the magnification selecting device related to the present invention to better facilitate selecting of desired magnification by selecting a specific magnification to execute the neded copying operation using regular-sized original and copying papers at a specific magnifications at which varying speed can be slowed down and also by allowing the controller system to store other magnifications. The spirit and scope of the present invention is not limitative of those preferred embodiments described above.

For example, the magnification selecting device embodied in the present invention is also capable of slowing down varying speed of magnifications in a range of those steps other than 5 steps centering the predetermined magnification as well as capable of setting the rate of slowing down varying speed at a desired level other than those which are suggested by the preferred embodiments described earlier. In addition, it is also possible for the system to slow down varying speed of magnification within the predetermined number of steps centering any of the stationary magnifications out of those predetermined stationary magnifications. Furthermore, it is also possible for the magnification selection device reflecting the preferred embodiments described above to simplify the constitution of the operation panel by abbreviating the stored-memory display 34, the stored-magnification selecting key 35, the stored-magnification reading key 36, and the magnificatoin storage key 37, respectively. In addition, various changes and modifications of design can be implemented within the scope that doesn't depart from the spirit of the present invention.

In summary, the magnification selecing device reflecting the present invention slows down variable speed of magnification when operating either of UP and DOWN keys only in a position which is close to the predetermined stationary magnification. As a result, it is possible for the system to easily and securely set the desired magnification close to the predetermined stationary magnification without significantly lowering the total speed needed for selecting magnification by properly controlling the timing needed for stopping the key operation while watching the magnification display, and yet by lessening the operating number of keys.

While only certain embodiments of the invention have been described, it will be apparent to those skilled in the art that various changes and modifications may be made therein without departing from the spirit and scope of the present invention as claimed.

What is claimed is:

1. In a photocopier including a magnification level indicator, an up control key for increasing the magnification level indication of the magnification level indicator with a fixed rate of increase, a down control key for reducing the magnification level indication of the magnification level indicator with a fixed rate of decrease, and copying means for providing a photocopy of an original document at the magnification level indicated by the magnification level indication of the magnification level indicator, the improvement comprising:

first means, responsive to actuation of the up control key, for determining the amount by which the magnification level indication differs from a predetermined magnification level indication;

second means, responsive to determination by said first means that the magnification level indication is less than the predetermined magnification level indication by a predetermined amount, for causing the magnification level indication to increase with a rate of increase less than the fixed rate of increase;

third means, responsive to actuation of the down control key, for determining the amount by which the magnification level indication differs from the predetermined magnification level indication; and fourth means, responsive to determination by said third means that the magnification level indication is greater than the predetermined magnification level indication by a predetermined amount, for causing the magnification level indication to decrease with a rate of decrease less than the fixed rate of decrease.

2. The improvement of claim 1, further comprising a fixed magnification level control key for setting the magnification level indication of the magnification level indicator to a magnification level indication differing from the predetermined magnification level indication.

3. The improvement of claim 1, further comprising a fixed magnification level control key for setting the magnification level indication or the magnification level indicator to the predetermined magnification level indication.

* * * * *